United States Patent [19]
Sakuma

[11] 3,842,431
[45] Oct. 15, 1974

[54] EYECAP FOR A COMPACT CAMERA

[76] Inventor: Kotaro Sakuma, No. 48-12, Higashu-Ogu 6-chome, Tokyo, Japan

[22] Filed: Oct. 4, 1973

[21] Appl. No.: 403,609

[30] Foreign Application Priority Data
May 1, 1973 Japan.............................. 48-52116

[52] U.S. Cl. .............................................. 354/287
[51] Int. Cl. ........................................... G03b 11/04
[58] Field of Search .................... 95/11; 350/57, 60; 354/287

[56] References Cited
UNITED STATES PATENTS
1,740,529   12/1929   Wandersleb .......................... 350/60
3,738,238   6/1973   Hager ............................... 350/57 X Primary Examiner—John M. Horan
Attorney, Agent, or Firm—Cushman, Darby & Cushman

[57] ABSTRACT

An eyecap for a compact camera comprising a frame in lateral U-shape having three side walls, a cap of a flexible material securely engaged with said frame through a receiving opening, and a rubber plate forming an adhesive member for securing the eyecap on a camera, the rubber plate also being adhered to an inner side of the frame, whereby the photographer can conveniently and clearly look at the object to be photographed and carry the compact camera with the eyecap conveniently and compactly folded.

2 Claims, 11 Drawing Figures

FIG. 1
PRIOR ART
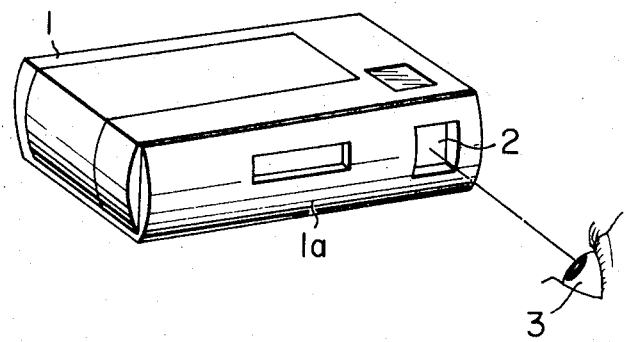
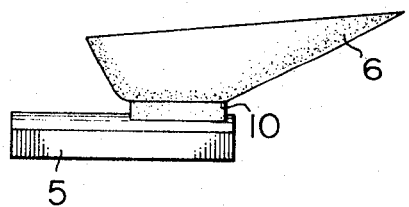
FIG. 2(a)
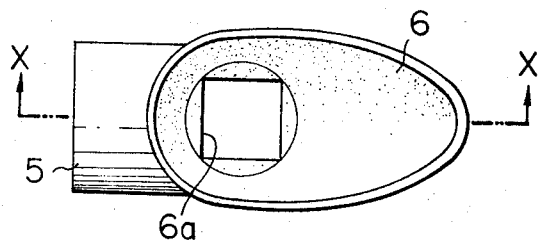
FIG. 2(b)
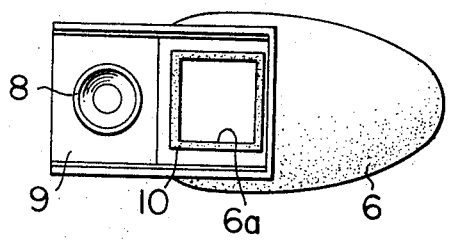
FIG. 2(c)
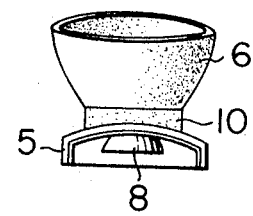
FIG. 2(d)
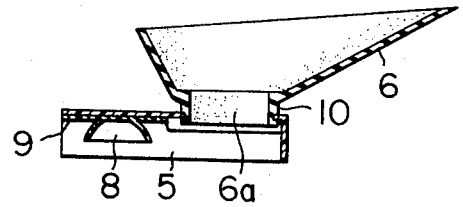
FIG. 2(e)

EYECAP FOR A COMPACT CAMERA

BACKGROUND OF THE INVENTION

1. Field of the Invention

This invention relates to an eyecap for a compact camera to allow the photographer to look the object more clearly and conveniently and yet permit the compact camera provided with the eyecap to be carried in his pocket.

2. Description of the Prior Art

Conventionally, there have been widely being used compact cameras of a solid, rectangular and book-shaped type, such as KODAK INSTAMATIC cameras. To minimize the size of the cameras, most of such conventional cameras have no accessories, which inconveniences some photographers.

As shown in FIG. 1, the photographer looks at the object through a finder 2 of the compact camera 1; he cannot attach his eye onto the finder and can only have his eye placed as close as possible to the finder. However, at that time, an outside ray may come through the gap between the finder and the photographer's eye thereby providing an inconvenient viewing of the object.

SUMMARY OF THE INVENTION

Therefore, present invention provides an eyecap for a compact camera to eliminate such inconvenience and disadvantages in the prior art.

An object of this invention is to provide an eyecap for a compact camera to permit the photographer to look at the object to be photographed more conveniently and clearly.

Another object of this invention is to provide an eyecap for a compact camera wherein said eyecap is elastically bent and folded onto the camera body to make the camera including the eyecap compact and conveniently carriable.

The eyecap comprises a frame in lateral U-shape and having three side walls, a cap of a flexible material securely engaged with said frame through a receiving opening, and a rubber plate forming an adhesive member which is adhered to an inner surface of the frame, the adhesive member being securable to a camera overlying the finder thereof whereby the photographer can conveniently and clearly place his eye against the cap and look at the object to be photographed.

BRIEF DESCRIPTION OF THE ACCOMPANYING DRAWING

FIG. 1 is a perspective view showing a conventional type compact camera;

FIG. 2 (a) is a bottom plan view showing an eyecap according to this invention;

FIG. 2 (b) is a rear elevation view showing the eyecap according to this invention;

FIG. 2 (c) is a front elevation view showing the eyecap according to this invention;

FIG. 2 (d) is a left end elevation view of the eyecap shown in FIG. 2 (b);

FIG. 2 (e) is a cross section showing the eyecap taken along the line X — X of FIG. 2 (b);

Figure 3A:
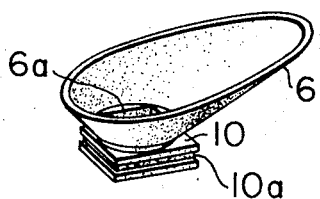
Figure 3B:
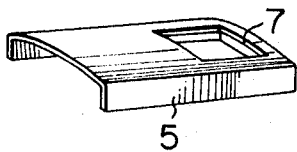
Figure 3C:
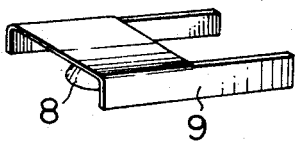
Figure 4:
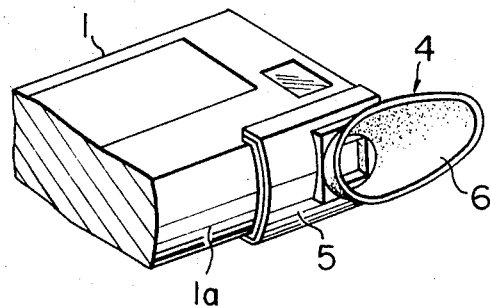
Figure 5:
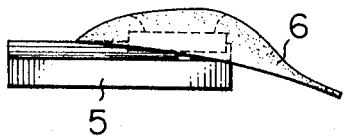

FIG. 3 (a) through 3 (c) are perspective views respectively showing, dissembled the cap, frame and resilient plate elements of the eyecap according to this invention;

FIG. 4 is a perspective view showing a compact camera having an eyecap according to this invention mounted thereon; and FIG. 5 is a side view showing a compact camera with the eyecap according to this invention which is resiliently folded to the camera body for permitting the camera with the eyecap to be more easily kept in a sack.

DESCRIPTION OF THE PREFERRED EMBODIMENT

Now, details of the preferred embodiment will be hereinafter discussed referring to the accompanying drawing wherein like parts are shown having like numerals.

In FIG. 4, there is shown an eyecap 4 comprising a frame 5 made of metal, synthetic resin or equivalent materials, and a cap 6 is made of resilient material such as rubber or equivalent materials. Said frame is provided with a square opening 7 as shown in FIG. 3 so as to attach a cap 6 thereto and securely attached with a resilient plate 9 made of rubber or equivalent material and including an adhesive member 8 for securing the eyecap to a camera.

As shown in FIG. 3, said cap 6 is provided with an outwardly opening 10a perimetrical groove which is engaged with the the perimeter of a square opening 7 provided on said frame 5.

Owing to the above construction, a cap 6 is engaged with the square opening 7 on the frame 5 via the groove 10a of the base 10 in a manner to secure the base in said opening 7.

Now, the method for attaching the eyecap according to this invention onto the camera will be described. At first, the square opening 6a formed on the cap 6 is mated with the finder 2 of the camera and then, the frame 5 is pushed strongly toward the back of the camera body so as to adhere the adhesive member 8 to the back 1a of the camera so that the eyecap 4 is securely held onto the camera 1.

Thus, since the frame 5 is engaged with the camera 1 at its periphery, outside light rays do not come between the photographer's eye and the finder at the back of the camera. Consequently, when the photographer presses the opening of the cap 6 around his eye, said cap 6 is fitted in place with periphery of his eye much as a mask for a skin-diver fits against the latter's face and he can look at the object to be photographed conveniently and clearly.

Furthermore, since the cap is flexible the portion 6 may be resiliently bent and folded in side out as shown in FIG. 5 in order that the camera with the cap can be conveniently carried within the photographer's pocket or sack.

As is apparent from the above, since the eyecap for the compact camera comprises a cap having a resiliently bendable and foldable cap and a frame closely mating with the camera at its periphery, one can look at the object to be photographed without interruption by stray light rays and the photographer may carry the camera conveniently within his pocket with the eyecap folded but still mounted in place.

The eyecap according to this invention is also applicable to usual larger cameras and also movie-cameras.

Minor alterations and modifications may be made to the described embodiment without departing from the spirit, scope of the invention.

I claim:

1. For a compact camera having a generally rectangular back with a viewer sight therein, an eyecap comprising:

a frame having a back and three peripheral sidewalls which extend forwardly at the top, bottom and one end thereof; means defining an opening through the frame, positioned to overlie the camera viewer when the frame back is in place against the camera back with the three frame sidewalls respectively engaging the top, bottom and one end of the camera;

resilient plate means secured to and lining the first two of said sidewalls of the frame and the forward side of the back of the plate from adjacent said opening to adjacent the opposite end of said frame, said resilient plate means including adhesive means for securing the eyecap to the camera; and a cap member of resilient material, including a base portion, having means defining an opening therethrough, and a flaring tubular eyecap portion;

means securing the base of the cap member to the frame with said openings through each in axial alignment so that the eyecap portion flares rearwardly from around the opening through the base, whereby a photographer may press his face, peripherally of his eye, against the rear of the eyecap portion to permit him to view through the finder without interference from stray light rays which could otherwise enter his vision from between his eye and the finder;

said eyecap portion being resiliently foldable from a rearwardly flaring condition of use, to an at least partially inside out condition to cause the camera including the eyecap to become more compact for carrying and storage.

2. The eyecap of claim 1 wherein the base of the cap member and opening through the frame are of generally square periphery and said securing means for the base of the cap member is constituted by means defining an outwardly opening perimetrical groove in the base, which groove receives the periphery of the generally square opening to secure the base to the frame.

* * * * *